(12) United States Patent
Inoue et al.

(10) Patent No.: US 6,261,531 B1
(45) Date of Patent: Jul. 17, 2001

(54) PRODUCTION METHOD OF IRON CARBIDE

(75) Inventors: Eiji Inoue; Torakatsu Miyashita, both of Kobe; Yoshio Uchiyama, Akashi; Junya Nakatani, Kobe; Teruyuki Nakazawa, Koganei; Akio Nio, Kiyose, all of (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 09/284,188

(22) PCT Filed: Feb. 25, 1998

(86) PCT No.: PCT/JP98/00791

§ 371 Date: Apr. 9, 1999

§ 102(e) Date: Apr. 9, 1999

(87) PCT Pub. No.: WO98/38129

PCT Pub. Date: Sep. 3, 1998

(30) Foreign Application Priority Data

Feb. 28, 1997 (JP) .................................................. 9-045763

(51) Int. Cl.$^7$ .................................................. C01B 31/30
(52) U.S. Cl. .............................................................. 423/439
(58) Field of Search ...................... 423/439, 440

(56) References Cited

U.S. PATENT DOCUMENTS 5,527,379  6/1996  Hirsch et al. ........................... 75/436
5,560,762  * 10/1996  Bresser et al. ........................ 423/439

FOREIGN PATENT DOCUMENTS

| 43 20 359 C1 | 10/1994 | (DE) . |
| 8-245212 | 9/1996 | (JP) . |
| 9-48604 | 2/1997 | (JP) . |
| WO 92/02646 | 2/1992 | (WO) . |
| WO 97/23655 | 7/1997 | (WO) . |

OTHER PUBLICATIONS

International Search Report, for International Application No. PCT/JP98/00791 Filed Feb. 25, 1998.

International Application with Request No. 98p051WO for Kawasaki Jukogyo Kabushiki Kaisha; and Preliminary Examination Report Dated Jun. 2,1998 and Notifications of WIPO (Forms PCT/IB301, 304, 308 and 332).

* cited by examiner

*Primary Examiner*—Steven P. Griffin
*Assistant Examiner*—Stuart L. Hendrickson
(74) *Attorney, Agent, or Firm*—Oppenheimer, Wolff & Donnelly

(57) ABSTRACT

Provided is a method for efficiently producing iron carbide depending on a particle size of an iron-containing material or the progress of reaction. In a fluidized bed reactor 7, a coarse iron ore is fluidized in blocks 8a to 8e, a fine iron ore is fluidized in blocks 9a to 9d, and a flow rate of a reaction gas supplied to the blocks for the fine iron ore is regulated by a flow regulating valve 11.

4 Claims, 4 Drawing Sheets

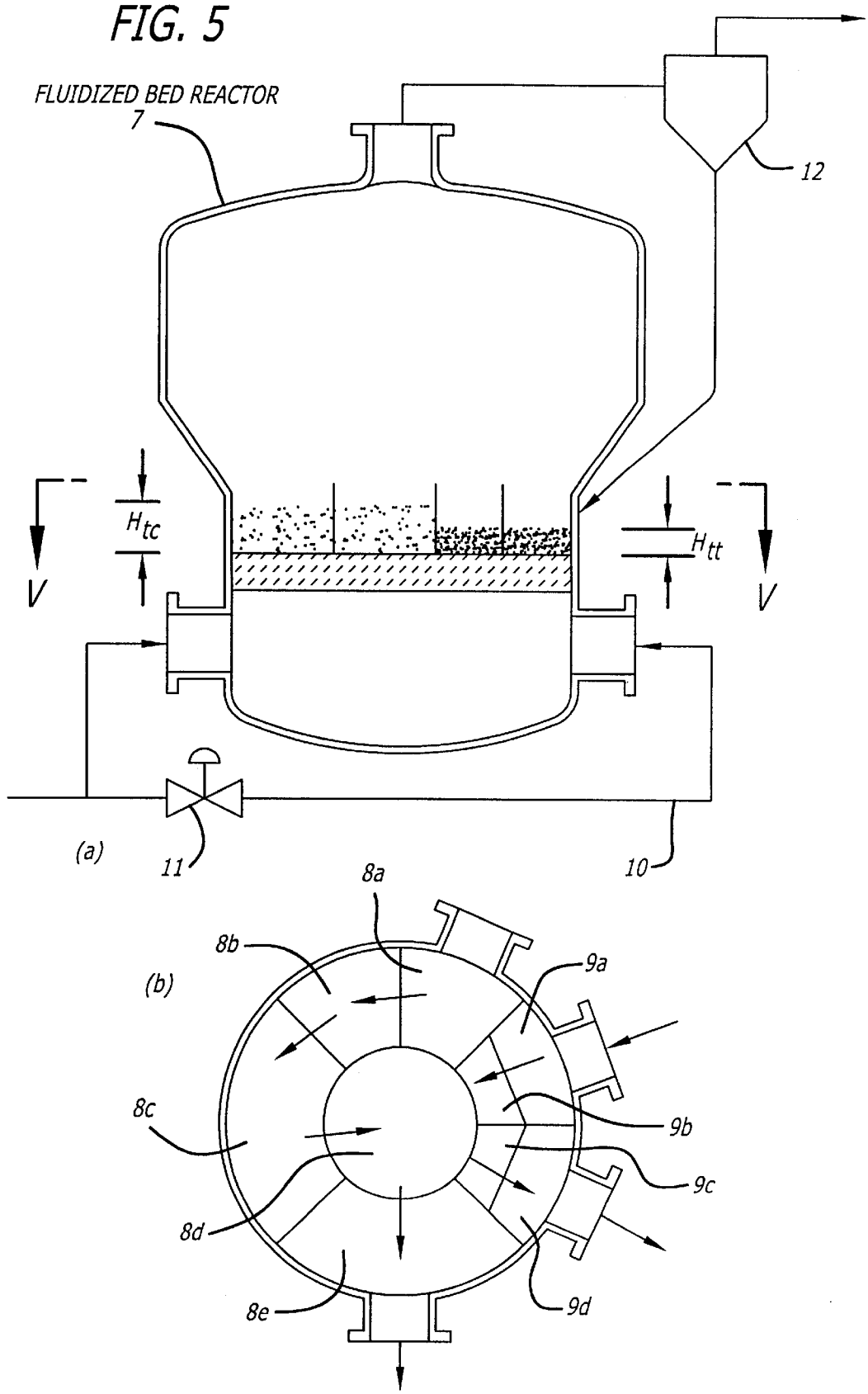

PRODUCTION METHOD OF IRON CARBIDE

TECHNICAL FIELD

The present invention relates to a method for producing iron carbide suitable for a raw material for iron making and steel making which comprises iron carbide ($Fe_3C$) as the main component, for example, a raw material for steel making which is used in an electric furnace and the like

BACKGROUND ART

The production of steel normally comprises the steps of converting iron ore to pig iron using a blast furnace, and thereafter converting the pig iron into steel using an open hearth furnace or a converter. Such a traditional method requires large amounts of energy and large-scale equipment, and has a high cost. Therefore, for a small-scale steel-making, a method comprising the steps of directly converting iron ore into raw materials used in the steel-making furnace, and converting the raw material into steel using an electric furnace and the like has been used. With respect to direct steel making process, a direct reduction process has been used to convert iron ore into reduced iron. However, the reduced iron produced by the direct reduction process is highly reactive and reacts with oxygen in the air to generate heat. Therefore, it is necessary to seal the reduced iron with an inert gas, or by some other measures, during transportation and storage of the reduced iron. Accordingly, iron carbide ($Fe_3C$) containing a comparatively high iron (Fe) content, and which has a low reaction activity and can be easily transported and stored, has recently been used as the iron-containing material for steel making in an electric furnace and the like.

Furthermore, an iron-making or steel-making material containing iron carbide as the main component is not only easy to be transported and stored, but also has the advantage that the carbon combined with iron element can be used as a source of energy in an iron-making or steel-making furnace, and can be used as a source to generate microbubbles which reduce nitrogen in the steel-making bath. Therefore, raw materials for iron making or steel making containing iron carbide as the main component recently have attracted special interest.

According to a conventional method for producing iron carbide, a fine iron ore is charged into a fluidized bed reactor or the like, and is caused to react with a gas mixture comprising a reducing gas (e. g., hydrogen gas) and a carburizing gas (e. g., methane gas and the like) at a predetermined temperature. Thus, iron oxides (e. g., hematite ($Fe_2O_3$), magnetite ($Fe_3O_4$), wustite (FeO)) in iron ore are reduced and carburized in a single process (which means a process performed by simultaneously introducing a reducing gas and a carburizing gas to a single reactor). This reaction is performed by the following overall reaction formula.

$$3Fe_2O_3+5H_2+2CH_4 \rightarrow 2Fe_3C+9H_2O$$

The prior art in the field of the present invention has been described, for example, in the publication of the Japanese translation of International Patent Application No. 6-501983, for example.

In order to easily understand the present invention, an example of an apparatus for producing iron carbide according to the prior art will be described below. For example, an apparatus shown in FIG. 1 has been known. With reference to FIG. 1, the reference number 1 denotes a fluidized bed reactor. Fluidized bed reactor 1 has a bottom part to which a line 2 for supplying reaction gases (a reducing gas and a carburizing gas) is connected, and a top part to which a line 3 for discharging the gas after reaction is connected. The reference number 4 denotes a preheating furnace. A fine iron ore fed to preheating furnace 4 is subjected to a preheating treatment for a predetermined time in preheating furnace 4. Then, the preheated iron ore is fed into fluidized bed reactor 1 through a line 5, and is subjected to a reducing and carburizing reaction for a predetermined time at a predetermined reaction temperature and reaction pressure in fluidized bed reactor 1. Thus, iron carbide product is discharged from a line 6.

In the case where a particle size distribution of the iron ore is wide, it is difficult to proceed the reaction efficiently. The reason is as follows. In order to proceed the reaction efficiently, it is preferable that a velocity of a fluidized gas should be comparatively increased in fluidized bed reactor 1 if major particle size of the iron ore is large (coarse) but fine ores should be blown off, and that the velocity of the fluidized gas should be comparatively decreased in fluidized bed reactor 1 if major particle size of the iron ore is small (fine) but coarse ores should not be fluidized. There are preferable process conditions depending on respective particle sizes. Furthermore, a moving bed reactor is preferable for the iron ore having a large particle size. A gas for proceeding the reaction can easily pass through a gap in the large uniform particle size. An increase in the flow rate of the fluidized gas for fluidization causes generation of fine-sized iron ore by a further friction of particles and is disadvantageous to a yield of iron ores.

As indicated in the overall reaction formula, a particle of $Fe_2O_3$ is converted into a particle of $Fe_3C$ having about ¾ of an original weight. Furthermore, the fine iron ores rub against each other during fluidization so that their particle sizes are gradually reduced. Taking it into consideration that the weight of the fluidized material (fine iron ore) is gradually reduced as the reaction proceeds, it is preferable that the velocity of the reaction gas to be supplied to the fluidized bed reactor should be comparatively increased in the former half of the reaction and be comparatively decreased in the latter half of the reaction in order to proceed the reaction efficiently. Since there are proper process conditions according to the progress of the reaction, it is not preferable that the reducing reaction and the carburizing reaction should be performed under the same process conditions in the fluidized bed reactor.

In consideration of the above-mentioned problems of the prior art, it is an object of the present invention to provide a method for efficiently producing iron carbide depending on a particle size of an iron-containing material or the progress of reaction.

DISCLOSURE OF INVENTION

In order to attain the above-mentioned object, the present invention provides a method for efficiently producing iron carbide by classifying a fine iron-containing material for iron making into several grades according to a particle size, and by reducing and carburizing the iron-containing material corresponding to the respective particle sizes.

A first aspect of the present invention is directed to a method for producing iron carbide comprising the steps of classifying a fine iron-containing material for iron making into several grades according to a particle size, and reducing and carburizing each iron-containing material belonging to each grade. According to the first aspect of the present invention, it is possible to treat a fine iron- containing material for iron making which has a wide particle size distribution. By selecting the process conditions depending on a particle size, iron carbide can be produced efficiently.

A second aspect of the present invention is directed to the method for producing iron carbide according to the first aspect of the present invention, wherein the fine iron-containing material for iron making is classified into several grades according to a particle size after preheating. According to the second aspect of the present invention, the following effects can be obtained in addition to the above-mentioned effects. More specifically, if it is difficult to classify a wet iron- containing material, a classifying operation itself can easily be performed because the classification is performed in a dry state after preheating or a first stage reaction process. Furthermore, the present invention is suitable for treating such iron-containing material as the fine iron ore generated from a raw material which is easily broken by heat does not become a by-product but a product.

A third aspect of the present invention is directed to the method for producing iron carbide according to the second aspect of the present invention, wherein reducing and carburizing reaction process comprise a first stage reaction process for performing a part of reducing reaction and then a second stage reaction process for performing further reducing and carburizing reaction. According to the third aspect of the present invention, the following effects can be obtained in addition to the above-mentioned effects. Various countermeasures can be taken for each process which cannot be performed by the method for producing iron carbide in a single reactor process according to the prior art. Thus, a flexible process can be attained. Consequently, a conversion rate and a reaction speed can easily be controlled. Furthermore, the energy consumed in the generation of the by-product can be recovered effectively.

A fourth aspect of the present invention is directed to a method for producing iron carbide, comprising the steps of classifying a fine iron-containing material for iron making into several grades according to a particle size after a first stage reaction process for reducing a part of the iron-containing material, and carrying out a second stage reaction process for performing further reducing and carburizing reaction for each iron-containing material belonging to each grade. According to the fourth aspect of the present invention, the method of the present invention is suitable for treating the iron-containing material which become easily finer by a reducing reaction.

A fifth aspect of the present invention is directed to a method for converting a fine iron-containing material for iron making into iron carbide by a fluidized bed reactor having a fluidized bed part divided into several compartments by partition walls, comprising the steps of dividing the compartments into two portions for coarse and fine iron-containing materials respectively, and reducing and carburizing the coarse iron-containing materials in the one portion and the fine iron-containing materials in the other portion. According to the fifth aspect of the present invention, the supply of the raw material can be treated in one reactor in which fine and coarse ores are reacted separately under proper conditions for each ores. Thus, utilization of reaction gas is optimized and efficient process is achieved.

In the present invention, the iron-containing material for iron making is an iron ore or a dust or the like which is generated from an iron making process comprising at least one of iron oxides such as hematite, magnetite and wustite and iron hydroxides such as ferrous hydroxide and ferric hydroxide or the mixtures thereof of more than two as the main component.

According to the present invention having the above-mentioned constitution, the fine iron-containing material for iron making which has a wide particle size distribution can be classified into several grades according to the particle sizes, and process conditions (reaction temperature, reaction time, a gas flow rate and the like) corresponding to the respective particle sizes can be selected for an iron-containing material belonging to each grade. Consequently, iron carbide can be produced efficiently.

Some iron-containing materials are easily broken by heat. Such materials are classified after preheating, and process conditions depending on each particle size are selected after the classification. Consequently, iron carbide can be produced efficiently.

Furthermore, by applying a two-stages process for carrying out a first stage reaction process performing a part of reducing reaction and then a. second stage reaction process performing further reducing and carburizing reaction, a gas used in the first stage reaction process can be an optimum composition for only the reducing reaction, and a gas used in the second stage reaction process can be an optimum composition for the further reducing and carburizing reaction. By applying the two-stages process, in the reduction and carburization (conversion into iron carbide) of the iron-containing material, a reaction speed can be increased and a reaction time (a time required for converting the iron-containing material into iron carbide) can be shortened as compared with a process for producing iron carbide in a single process.

Some iron-containing materials become easily finer by a reducing reaction. Such materials are classified after partial reduction, and the reducing and carburizing reaction conditions corresponding to each particle size are selected after the classification. Consequently, the reaction can be performed efficiently.

In the fluidized bed reactor having a fluidized bed part divided into several compartments partition walls, the compartments are classified into two portions for iron-containing materials comprising coarse and fine particles, and reducing and carburizing the iron-containing materials comprising coarse and fine particles are separately carried out. Consequently, the supply of the raw material and the discharge of the products can be continuously performed, and the fluidization can uniformly be carried out for both coarse and fine particles, and a contact area between the reaction gas and the raw material can be designed properly for fine particles so that the reaction time can be shortened.

BRIEF DESCRIPTION OF DRAWINGS

FIG. 5 (*a*) is a side sectional view showing a fluidized bed reactor suitable for carrying out a method according to the present invention, and FIG. 5 (*b*) is a sectional view taken along the line V—V in FIG. 5 (*a*).

BEST MODE FOR CARRYING OUT THE INVENTION

The case where a method according to the present invention is applied to a fluidized bed reactor will be described below.

(1) Timing of Classification

As described above, some iron-containing materials are easily broken by heat or become easily finer by a reducing reaction. For example, the rate of generation of a fine iron ore having a size of 70 μm or less is generally varied according to the kind of the raw material iron ore (from 0.1 mm to 1.0 mm) depending on the circumstances of the treatment to which the iron ore is subjected as shown in Table 1.

TABLE 1

|  | Kind of Iron Ore | | | |
| --- | --- | --- | --- | --- |
|  | A | B | C | D |
| After preheating | 1% | 8% | 0% | 12% |
| After reduction | 12% | 2% | 5% | 4% |
| After carburization | 5% | 1% | 2% | 1% |

As will be described below, the optimum process conditions can be taken by applying a timing of classification suitable for the kind of the iron ore. (a) In the case where the iron ore (ore "B" and "D") which is easily broken by heat is used as a raw material, it is preferable that the process shown in FIGS. 2 (a) and 2 (b) should be applied. (b) In the case where the iron ore (ore "A") which become easily finer by a reducing reaction is used as the raw material, it is preferable that the process shown in FIG. 3 should be applied.

Figure 1:
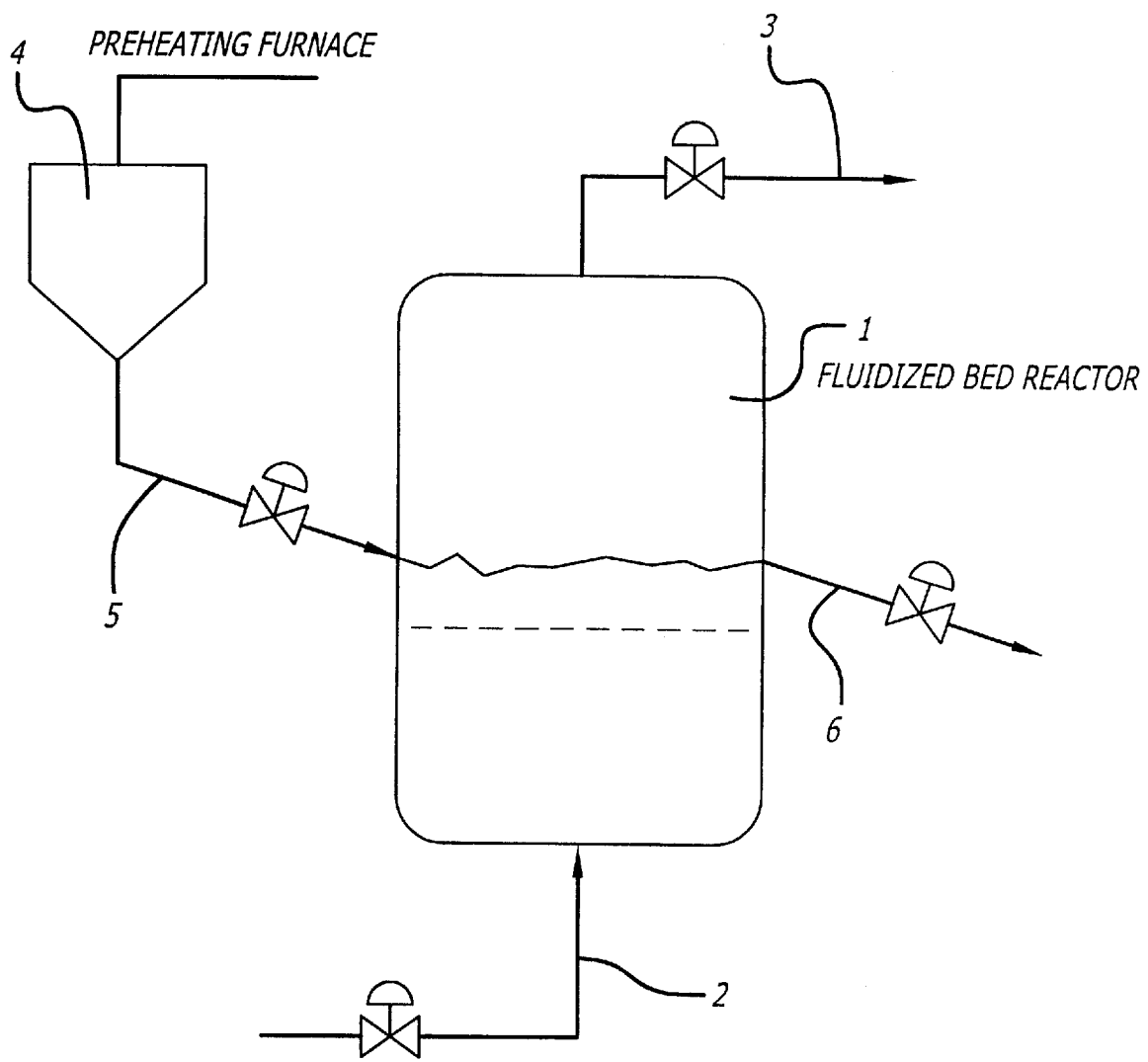
FIG. 1 is a view showing a schematic flow according to a prior art of an apparatus for producing iron carbide.
Figure 2:
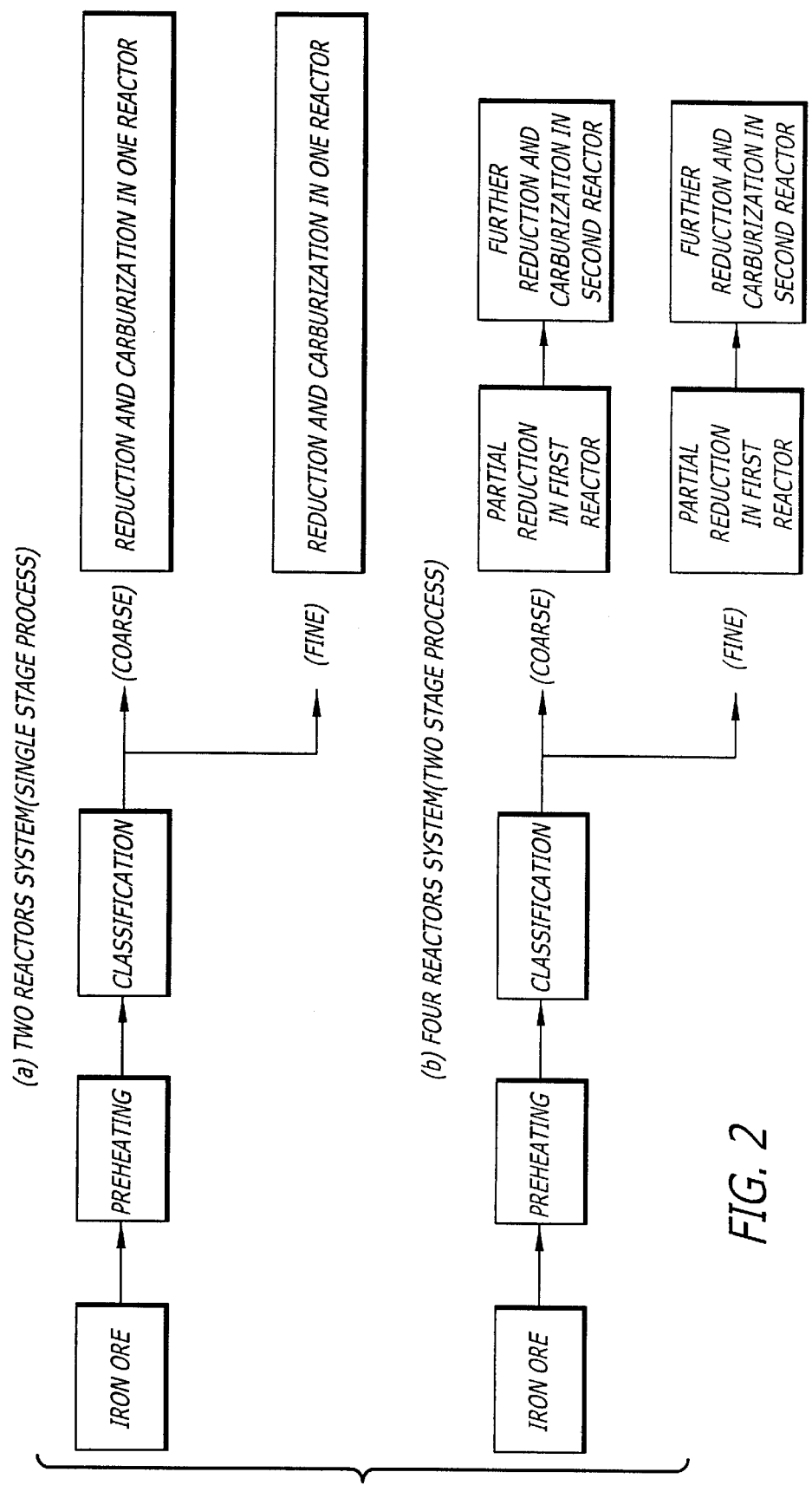
FIGS. 2 (*a*) and 2 (*b*) are diagrams showing examples of the process performed when producing the iron carbide according to the present invention, respectively.
Figure 3:
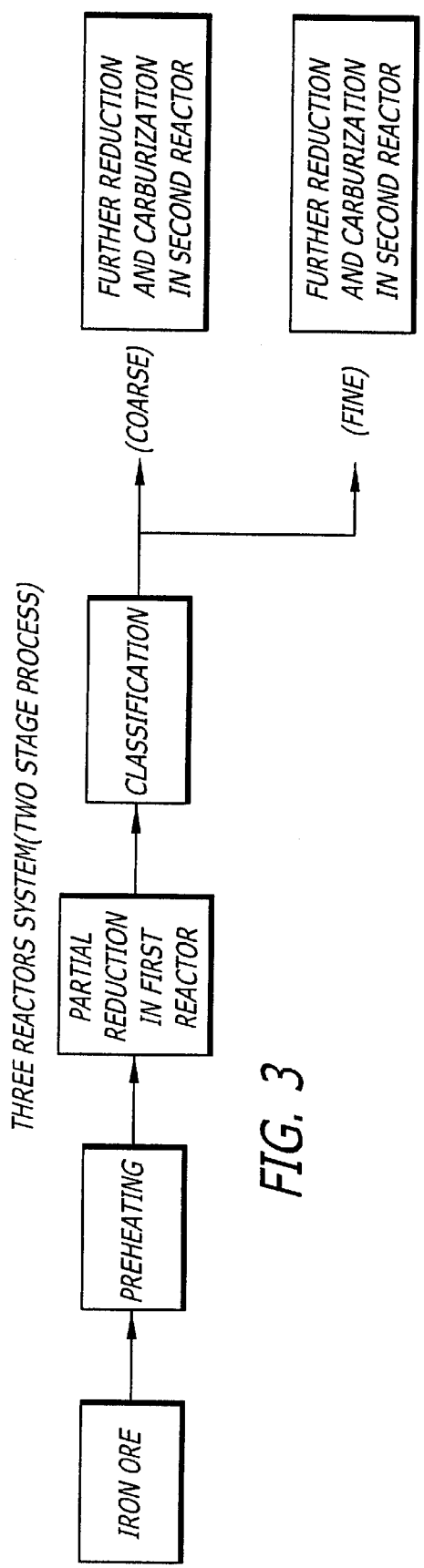
FIG. 3 is a diagram showing another example of the process performed when producing the iron carbide according to the present invention.

In FIGS. 2 (a) and 2 (b) and FIG. 3, while coarse and fine iron ores can be separately treated in respective reactor, they can simultaneously be treated in one reactor if the reactor has the configuration described in (3). Furthermore, the classification can be set to two or more depending on the particle size distribution of the iron ore.

(2) Selection of Classification Size

Figure 4:
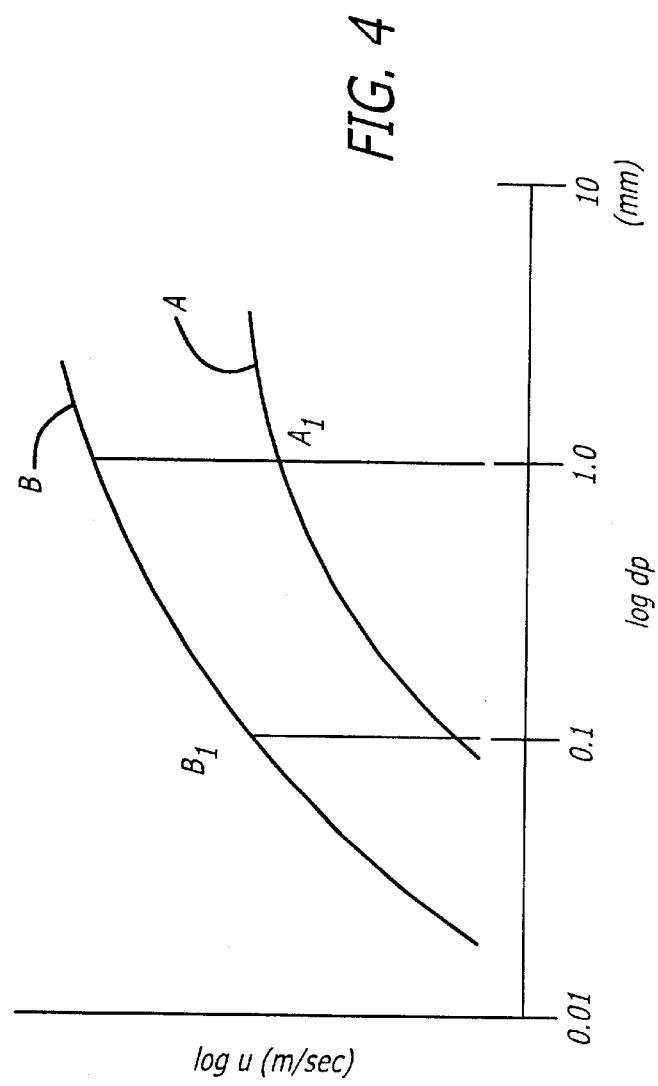
FIG. 4 is a chart showing a range of fluidization based on a particle size and a gas flow rate.

A classification size for division into coarse and fine iron ores based on the particle size distribution of the iron ore can be obtained as shown in FIG. 4, for example. FIG. 4 shows a range of fluidization, wherein a horizontal axis indicates a particle size (dp: logarithmic representation) and a vertical axis indicates a superficial speed (u: logarithmic representation). The line A indicates a lower limit of the fluidization. Below the line A, the speed is not enough to fluidize the iron ore in the reactor. The line B indicates a limit of a blowing speed (terminal speed). Above the line B, the speed is too high so that the iron ore is blown off, and similarly, the iron ore can be neither floated nor fluidized.

As shown in FIG. 4, if the particle size distribution of the iron ore ranges from 0.1 to 1.0 mm, the iron ore can be floated and fluidized under the same process conditions. Because, gas speed at A1 is lower than that at B1. However, if the particle size distribution of the iron ore is wide, for example, the iron ore comprises a fine iron ore having a particle size of 0.05 to 0.5 mm and a coarse iron ore having a particle size of 0.5 to 5 mm, it is preferable that the reaction should be performed for the fine iron ore and the coarse iron ore separately in order to cause the reaction to proceed efficiently and that a boundary size for division into "fine" and "coarse" should range from 0.2 to 0.8 mm. If the coarse iron ores having particle sizes of 5 to 7 mm or more is major, it is preferable that a moving bed reactor should be used.

(3) Equipment for Classification

In the case where the iron ore is classified on the basis of the particle size distribution, the coarse iron ore and the fine iron ore can be treated in separate reactors to take operating conditions depending on the particle size. However, the coarse iron ore and the fine iron ore can be simultaneously treated in one reactor if the reactor has a configuration shown in FIG. 5. More specifically, fluidized bed reactor 7 is divided into compartments 8a to 8e for the coarse iron ore and compartments 9a to 9d for the fine iron ore, a flow regulating valve 11 is provided on a line 10 for a reaction gas to be supplied to the compartments of the fine iron ore, and the fine iron ore in a gas discharged from the reactor is caught by a cyclone 12. The fine iron ore is returned to the compartments 9a to 9d.

According to the reactor having the above-mentioned configuration, it is also possible to simultaneously treat the fine iron ore and the coarse iron ore by using a single reactor having the same inlet gas composition according to the following method. By adjusting flow regulating valve 11, it is possible to control the flow rate of the reaction gas to have best fluidization of the fine and coarse iron ore. In this case, it is preferable that a flow rate (=superficial velocity) of the reaction gas for the fine iron ore should be decreased to avoid blowing off fine iron ore and a bed height (Hff) of the fine iron ore should be set smaller than a bed height (Hfc) of the coarse iron ore to have the same contact (gas and ores) time. The fine iron ore tends to have a reaction speed which is a little higher than the coarse iron ore as shown in Table 2. Table 2 indicates a reduction rate, wherein a Gas vs. Solid ratio is set to 0.059 kg/SLM, a reaction temperature is set to 63° C. a reaction pressure is set to 4 to 5 atm, and a hydrogen concentration in the reaction gas is set to 65 to 80%. Fine iron ore (Z) has a reduction rate which is a little higher than that of coarse iron ore (X, Y).

SLM designates Standard Liter per Minute (1 liter in a normal condition/minute).

Therefore, in case that fine and coarse ores are reacted in one reactor, fine ores is too much acted to react coarse ores properly.

TABLE 2

|  |  | Reaction Time | |
| --- | --- | --- | --- |
| Kind of Iron Ore | Particle Size (mm) | 30 mins. | 60 mins. |
| X | 0.1 to 0.5 | 26% | 38% |
| Y | " | — | 45% |
| Z | 0.01 to 0.1 | 31% | 48% |

According to the present invention, the fine iron ore and the coarse iron ore are reacted separately in the same fluidized bed reactor. Consequently, an amount of a gas to be used per unit weight of iron ore can be reduced and a residence time in the reactor can be shortened. Thus, it is possible to produce iron carbide economically and efficiently.

The classified iron ore of finer particles can be not only used for producing iron carbide but also utilized as an auxiliary material for producing cement or feed material after granulation.

INDUSTRIAL APPLICABILITY

Since the present invention has the above-mentioned constitution, the apparatus according to the present invention is suitable for the apparatus to efficiently produce iron carbide depending on a particle size of an iron-containing material or the progress of reaction.

What is claimed is:

1. A method for producing iron carbide comprising the steps of: classifying a fine-grained iron-containing material for producing iron carbide into several grades according to a particle size; and separately reducing and carburizing each iron-containing material belonging to each grade, wherein the fine-grained iron-containing material for producing iron carbide is classified into several grades according to a particle size after preheating.

2. The method for producing iron carbide according to claim 1, wherein reducing and carburizing reaction processes are performed in two stages comprising the steps of:
   a first stage reaction process for performing a part of reducing reaction and then a second stage reaction process for performing further reducing and carburizing reaction.

3. A method for producing iron carbide comprising the steps of:
   classifying a fine-grained iron-containing material for producing iron carbide into several grades according to a particle size after a first stage reaction process for partial reducing of the iron-containing material; and
   carrying out a second stage reaction process for performing further reducing and carburizing reaction separately for each iron-containing material belonging to each grade.

4. A method for converting a fine-grained iron-containing material into iron carbide by a fluidized bed reactor having a fluidized bed part divided into several compartments by partition walls,
   characterized in that the compartments are divided into two portions for coarse iron-containing materials and fine-grained iron-containing materials respectively, and the coarse-grained iron-containing materials have a particle size of 0.5 to 5 mm and the fine-grained iron-containing materials have a particle size of 0.05 to 0.5 mm, and
   the method comprising the steps of reducing and carburizing the coarse-grained iron-containing materials in the one portion of the reactor and the fine-grained iron-containing materials in the other portion of the reactor.

* * * * *